(12) United States Patent
Little

(10) Patent No.: US 12,060,004 B2
(45) Date of Patent: Aug. 13, 2024

(54) MEMBRANE SENSOR DEVICE FOR POSITION DETECTION AND DRIVE ASSEMBLY, REAR VIEW DEVICE AND VEHICLE THEREWITH

(71) Applicant: MOTHERSON INNOVATIONS COMPANY LIMITED, London (GB)

(72) Inventor: Andrew Brian Little, Portchester (GB)

(73) Assignee: Motherson Innovations Company Limited, London (GB)

( * ) Notice: Subject to any disclaimer, the term of this patent is extended or adjusted under 35 U.S.C. 154(b) by 711 days.

(21) Appl. No.: 17/217,033

(22) Filed: Mar. 30, 2021

(65) Prior Publication Data
US 2021/0302204 A1 Sep. 30, 2021

(30) Foreign Application Priority Data
Mar. 31, 2020 (DE) .................. 10 2020 108 931.7

(51) Int. Cl.
| | | |
|---|---|---|
| *B60R 1/06* | (2006.01) | |
| *B60R 1/07* | (2006.01) | |
| *B60R 11/00* | (2006.01) | |
| *B60R 11/02* | (2006.01) | |
| *B60R 11/04* | (2006.01) | |
| *B60S 1/04* | (2006.01) | |
| *B60S 1/56* | (2006.01) | |
| *G01D 5/165* | (2006.01) | |

(52) U.S. Cl.
CPC .............. *B60R 1/0602* (2013.01); *B60R 1/07* (2013.01); *B60S 1/04* (2013.01); *B60S 1/56* (2013.01); *G01D 5/165* (2013.01); *B60R 2011/004* (2013.01); *B60R 2011/0085* (2013.01); *B60R 11/0229* (2013.01); *B60R 11/04* (2013.01)

(58) Field of Classification Search
CPC .......... G01D 5/165; B60R 1/07; B60R 1/074; B60R 11/04; B60R 2011/0085
See application file for complete search history.

(56) References Cited

U.S. PATENT DOCUMENTS

| | | | | |
|---|---|---|---|---|
| 5,945,929 | A * | 8/1999 | Westra .................. | H01H 13/702 338/114 |
| 6,209,408 | B1 * | 4/2001 | DeJonge ............... | F16H 59/044 74/335 |
| 2010/0062664 | A1 * | 3/2010 | Hewitt .................. | B60F 3/0007 440/12.52 |
| 2012/0036937 | A1 * | 2/2012 | Sprenger ............... | G01L 9/0089 73/744 |
| 2013/0120578 | A1 * | 5/2013 | Iga ..................... | B62D 15/0275 348/148 |

FOREIGN PATENT DOCUMENTS

| | | | |
|---|---|---|---|
| DE | 20022740 U1 | 2/2002 | |
| DE | 102008008727 A1 | 8/2009 | |
| WO | WO-2018087698 A1 * | 5/2018 | ............. B60G 17/00 |

* cited by examiner

*Primary Examiner* — Jermele M Hollington
*Assistant Examiner* — Temilade S Rhodes-Vivour
(74) *Attorney, Agent, or Firm* — Jones Day

(57) ABSTRACT

A sensor device is adapted for position detection associated with a drive assembly of a rear view device of a vehicle, with the drive assembly including at least one shaft driven by a DC motor, the sensor device having a membrane position sensor acting as a potentiometer the resistance of which depends on the relative rotational position of the motor shaft.

11 Claims, 4 Drawing Sheets

MEMBRANE SENSOR DEVICE FOR POSITION DETECTION AND DRIVE ASSEMBLY, REAR VIEW DEVICE AND VEHICLE THEREWITH

CROSS-REFERENCE TO RELATED APPLICATION

This application claims the benefit of foreign priority to German Patent Application No. DE 10 2020 108 931.7, filed Mar. 31, 2020, which is hereby incorporated by reference herein in its entirety for all purposes.

BACKGROUND

1. Field of the Invention

The present disclosure refers to a membrane sensor device for position detection and a drive assembly, a rear view device as well as a vehicle with such a sensor device.

2. Related Art

An external rear view mirror assembly according to U.S. Pat. No. 8,366,285 B2 comprises a mounting bracket mountable to a vehicle, the mounting bracket having a mirror base with detent features disposed on a detent circle on the mirror base; and a mirror head frame rotatably mounted to the mirror base for rotation about a mirror head axis, the mirror head frame having detent features to match the detent features of the mirror base, the detent features of the mirror base and the mirror head frame forming a detent system, the detent system having at least a drive position. A primary spring is acting between the mirror head frame and the mirror base in a direction parallel to the mirror head axis, the primary spring for holding the detent engaged in the detent position(s). A power fold mechanism is operably interposed between the mirror base and the mirror head frame, the power fold mechanism having a drive train; and a clutch mechanism comprises a pair of opposed clutching faces connecting the drive train to the mirror base when the drive train is driving, the clutch mechanism being arranged and constructed such that forces are not transmitted from the mirror head frame to the drive train during manual folding of the mirror head when the drive train is not driving, the power fold mechanism including a power fold housing installable into the mirror head frame for rotation therewith, a drive train including a motor mounted to the power fold housing and a drive gear operatively connected to the motor, the drive gear having a plurality of circumferentially spaced apart axially extending protrusions; and the clutch mechanism including a main ramp ring interposed between the drive gear and the base, the main ramp ring having a plurality of ramped recesses for receiving respective said protrusions such that relative rotation between the drive gear and the ramp ring results in their relative axial displacement, the main ramp ring operatively connected to the mirror base, the clutch having an engaged position where the main ramp ring is rotationally fixed with respect to the mirror base and a disengaged position in which the main ramp ring is rotatable with respect to the mirror base. An electric stall system has a stall position in which the system stalls the drive gear such that the drive gear cannot rotate with respect to the power fold housing, and having a non-stall position in which the system does not restrict rotation of the drive gear with respect to the housing. The electric stall system comprises a sensor system, the sensor system detecting at least one relative rotational position between the housing and the drive gear, wherein the sensor system stalls the drive gear by cutting power to the motor.

U.S. Pat. No. 9,487,142 B2 provides a rearview mirror assembly such as an exterior mirror assembly mounted at a side of an equipped vehicle that includes a powerfold actuator system to pivot the mirror head of the mirror assembly relative to a base between a drive or use position and a folded or park position responsive to a user input. The powerfold system is operable to provide the desired adjustment of the mirror head via a single actuation of the user input and may include a rearward range sensor at an actuator. The rearward range sensor may comprise a sensor that detects if the mirror head is anywhere rearward of drive position (towards the park or folded position), in particular in form of a hall effect sensor that is mounted at the base and an arc-shaped magnet that is mounted at a moving arm. When the mirror head is at a rearward position, the sensor may detect the presence of the magnet at or near the sensor, whereas when the mirror head is pivoted to the drive position or forward of the drive position, the magnet is moved away from the sensor and the sensor does not detect its presence.

Membrane potentiometers as such are known. Such a membrane potentiometer consists of a resistive path that is printed onto a membrane base, and a collector with a printed short-circuit path that is applied on top of this base. Both paths are separated by a circumferential spacer. When pressure is applied to the collector foil, electrical contact is simultaneously applied to the resistive path and a voltage can be tapped into movement via the collector foil. Once the pressure being applied to the collector foil ceases, the voltage can no longer be tapped. Further details are described for example in U.S. Pat. No. 8,188,834 B2. Accordingly, a device for detecting the location of a compression point comprises a first substrate on which an electrical resistive element is mounted; a second substrate on which a contact electrode is mounted, said contact electrode being disposed opposite said resistive element at an electrically insulating distance and can be brought into electrical contact with said resistive element by pressing said first and second substrates together; an electrical or electronic circuit for detecting the location of the compression point; and at least one flat leaf spring of spring-grade sheet metal, on at least one of said first and second substrates and which covers the compression zone of said first and second substrates.

SUMMARY

In an aspect, a sensor device is adapted for position detection associated with a drive assembly of a rear view device of a vehicle, with the drive assembly including at least one shaft driven by a DC motor, wherein the sensor device comprises a membrane position sensor acting as a potentiometer the resistance of which depends on the relative rotational position of the motor shaft.

According to one embodiment the membrane position sensor comprises at least one active area extending along at least one region between two opposite ends of the membrane sensor, with preferably either a first end being fixedly attached to the motor shaft and the second end being fixedly attached to a reference means relative to which the motor shaft can rotate such that rotation of the shaft in a first direction tightens the membrane position sensor and rotation of the motor shaft in a second direction being reverse to the first direction loosens the membrane position sensor, or the membrane position sensor is fixedly attached at least along the active area to a reference means relative to which the motor shaft can rotate and a wiper is attached to the motor shaft to rotate therewith such that rotation of the motor shaft in a first direction forces the wiper to travel along the active areas away from the first end and rotation of the motor shaft in a second direction being reverse to the first direction forces the wiper to travel along the active areas towards the first end.

It is proposed that the wiper comprises a wheel rotatable attached to a, preferably biased, shaft mounted on the motor shaft, in particular via a ring fitted around the motor shaft.

It is further proposed that the biased shaft is provided with a pressure spring between the wheel and the motor shaft and/or the ring.

In addition, it is proposed that the ring is attached by form and/or press fitting to the motor shaft, and/or projecting support means is provided on or with the motor shaft.

For an embodiment proportional feedback to the pressure induced by the tightening of a wiper on the active area results in a controlled voltage output, preferably derived from a stable 5 V DC supply, wherein an output is in particular ranging from 0.25 V DC to 4.75 V DC.

Still further, it is proposed that the membrane position sensor is at least partly curved, preferably at least along the active area from the first end to the second end, and/or the membrane position sensor, preferably at least along the active area from the first end to the second end, has a length allowing determining a rotation of the motor shaft of at least 90°, preferably up to 180°.

It is also possible that the membrane position sensor comprises a protective sheet associated with a first terminal, a spacer, a circuit layer with a second and third terminal and a double sided tape for attachment, with preferably the first terminal being arranged between the second and third terminal.

In addition, an embodiment is providing a drive assembly of a rear view device having a head carrying at least one reflective element, display and/or camera and a base to be attached to a vehicle, wherein the drive assembly comprises a first shaft driven by a first DC motor for a power fold suited to pivot the head relative to the base and a first sensor device associated with the first motor shaft according to one of the above embodiments, and/or at least one second shaft driven by at least one second DC motor for tilting and/or turning the reflective element and/or the camera relative to the head and/or the base and at least one second sensor device associated with the at least one second motor shaft according to any one of the above embodiments.

In this respect it is proposed that the reference means is provided by a housing, a housing part or a drum housing, in particular fixed to the base or the head.

Still further, a rear view device with a drive assembly according to the above embodiments is provided, wherein each sensor device is connected to an electronic control unit, in particular the vehicle electronic control unit, and/or a memory unit, in particular the vehicle memory unit.

It is further proposed that two sensors are provided, in particular dual sensors in an 'X' formation to output 2 voltages, one of which being an X angle and the other one Y angle to provide positional feedback voltages to the managing electronic control unit.

Also a vehicle with at least one rear view device according to above embodiments is provided.

Accordingly, a sensor device of one embodiment has a plane in the active area of its sensor membrane that can be used as "slide potentiometer". The resistance of the sensor device depends on where a wiper thereof presses on the plane. Thus, the sensor device is providing an adjustable or variable resistor which alters its resistance depending on where external pressure is applied along its length. When powered with a voltage, a linear plot can be made of the output voltage depending on the respective pressure position. That is, pressure applied to the internal material of the active area alters the resistance between 0 Ohm and the sensor's maximum resistance along its length such that the resistance can be scaled for position detection. This position detection is suited for determining the actual pivot position of a head of a rear view device relative to a base of the rear view device and, thus, a vehicle equipped with the rear view device. It is also suited for determining a reflective element and/or camera turn as well as tilt relative to the vehicle.

BRIEF DESCRIPTION OF THE DRAWINGS

The invention will be explained in more detail hereinafter by means of exemplary embodiments illustrated in the drawing.

DETAILED DESCRIPTION

Figure 1:
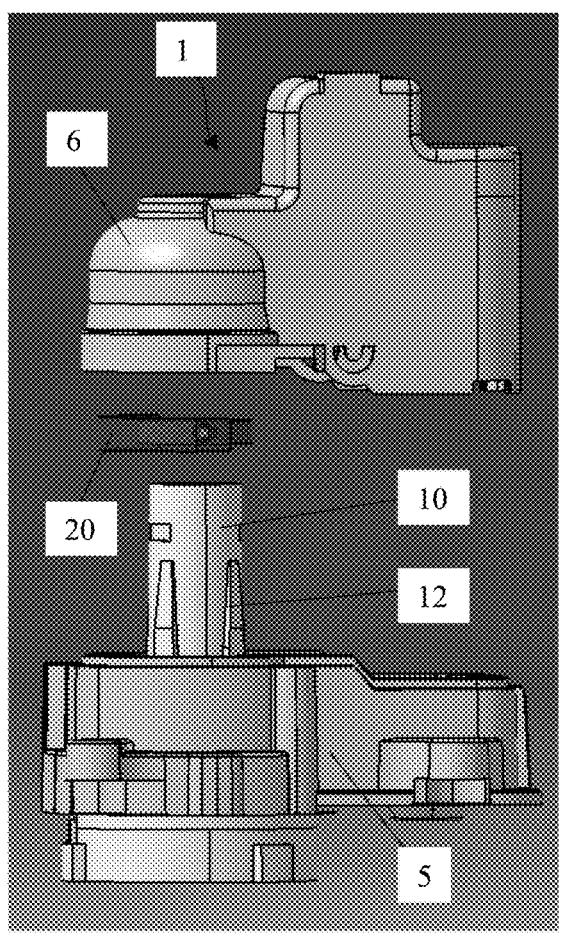
FIG. 1 is an exploded view of a sensor device adapted for usage in a rear view device.

FIG. 1 shows a drive assembly 1 for a rear view device with a lower housing 5 and an upper housing 6 between which a sensor device 20 according to one embodiment is arranged, with a motor shaft 10 extending from the lower housing 5 and being provided with projecting support means 12. Further details of the sensor device 20 can be seen in FIG. 2, whereas FIGS. 3 and 4 provide further details on the arrangement of the sensor device 20 between the lower housing 5 and the upper housing 6.

Figure 2:
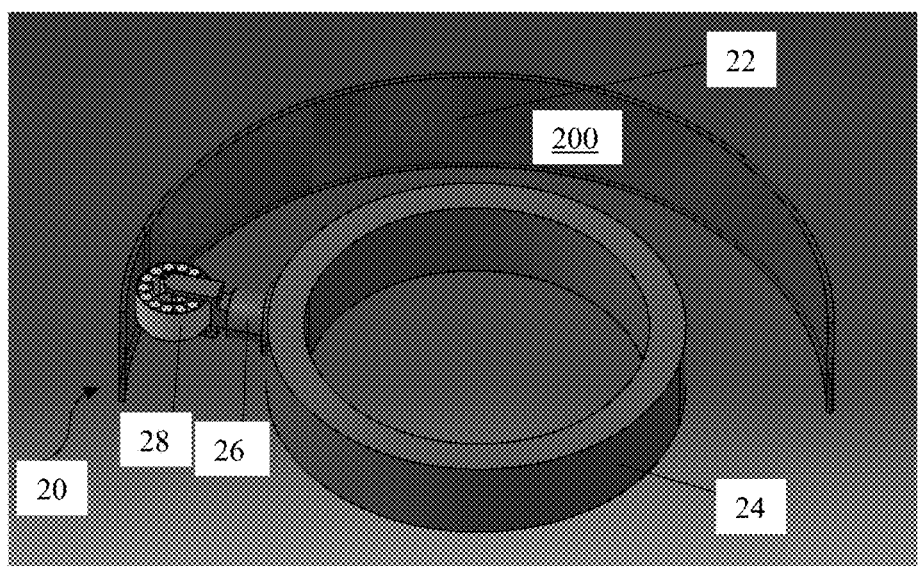
FIG. 2 is a perspective view of the sensor device of FIG. 1.

The sensor device 20 functions as a position membrane potentiometer and comprises for that purpose according to the embodiment of FIG. 2 a curved membrane sensor 22 with an active material 200 as further discussed below with respect to FIGS. 5a to d. Concentric within the curve of the membrane sensor 22 there is an attachment ring 24 which carries a biased shaft 26 for urging a wiper in form of a rotating pressure wheel 28 at its end against the active material of the membrane sensor 22.

Figure 3:
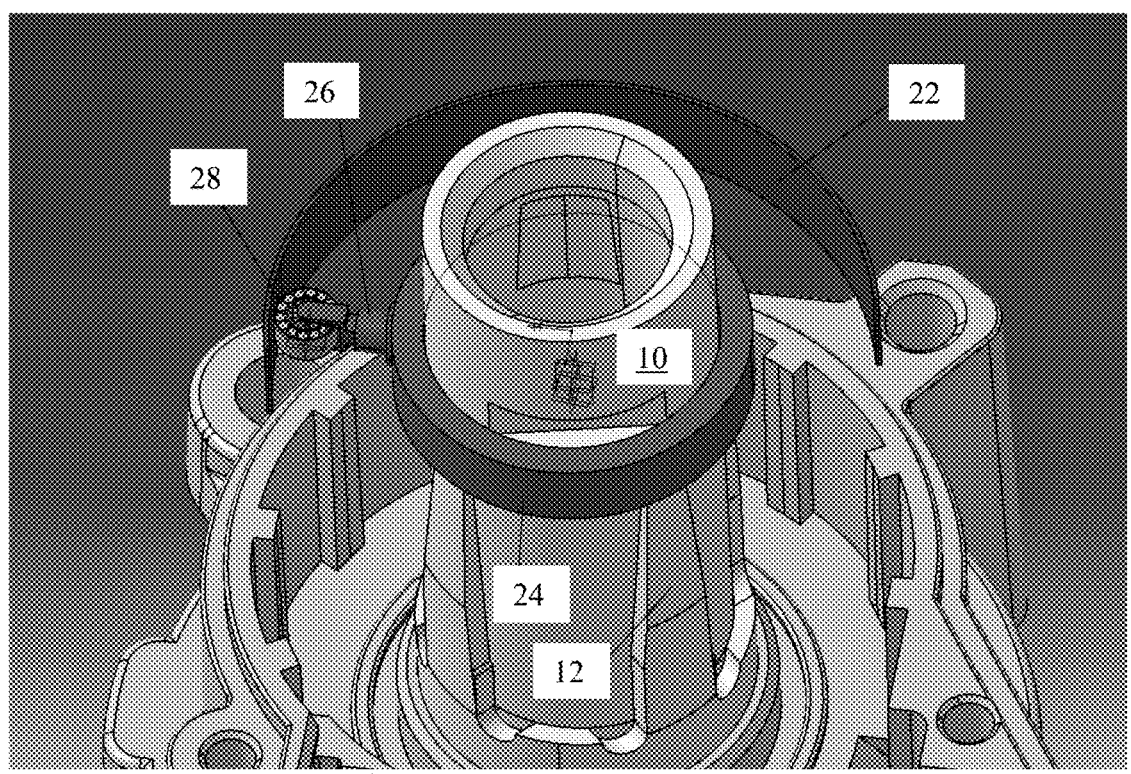
FIG. 3 is a perspective view of the sensor device of FIG. 2 together with a lower housing of the drive assembly.
Figure 4:
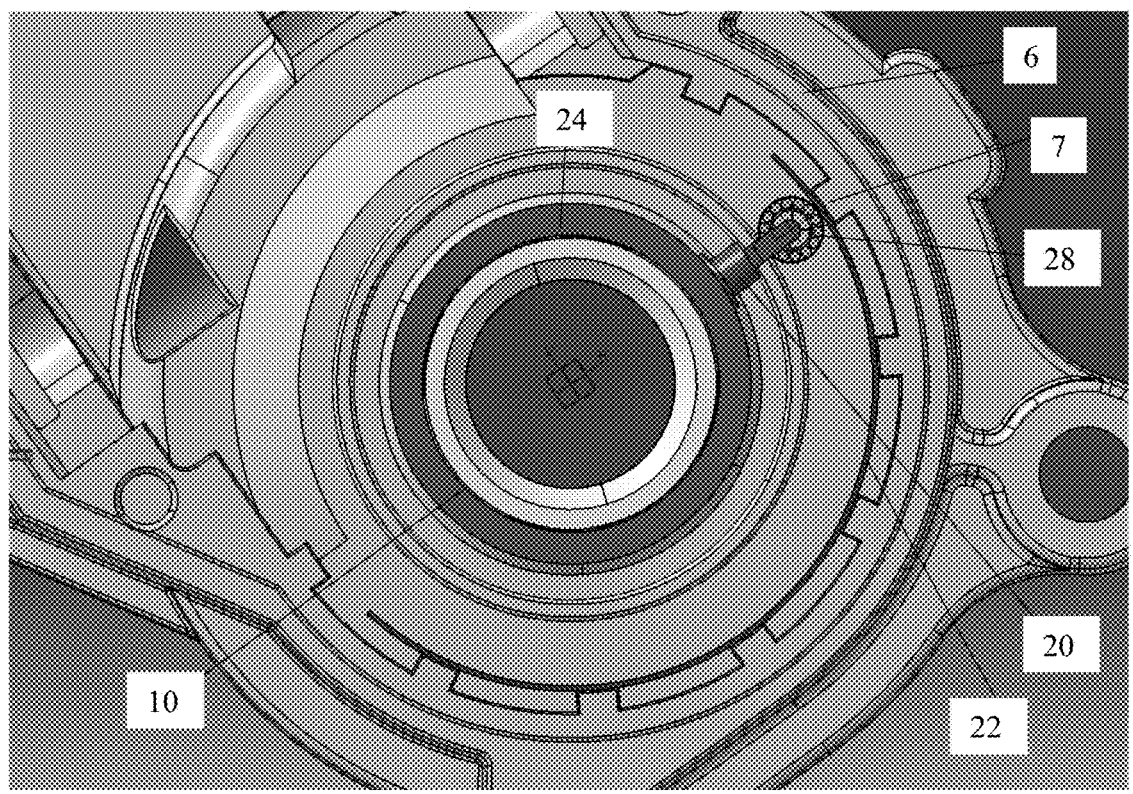
FIG. 4 is a cross section through the drive assembly of FIG. 1 with the sensor device of FIG. 2, FIGS. 5a, 5b, 5c, and 5d show details of a membrane position sensor to be used with the sensor device of FIG. 2.

In line with FIG. 3, the attachment ring 24 can be form fitted on the motor shaft 10 or better on the support means 12 thereof, whereas the membrane sensor 22 can be attached e.g. via an adhesive to the inner surface of the upper housing 6 or better projecting support means 7 thereof as shown in FIG. 4. Thus, the membrane position sensor 22 is fixedly attached along its active area to the upper housing 6 acting as reference means relative to which the motor shaft 10 can rotate to force the wheel 28 which is attached to the motor shaft 10 to rotate therewith and while rotating traveling along the membrane sensor 22.

The membrane sensor 22 can be provided with alternative size and resistive values whilst operating from −40° C. to +85° C. to be suited for an external rear view device to be mounted to a vehicle. For example, the dimensions of the active area 220 shown in FIG. 5a can be 15.88 mm×68.9 mm×0.43 mm, and there can be a layer structure as shown in FIG. 5b with a protection sheet 201 on top of a spacer 202, below which there is a circuit layer 203, with a double sided tape 204 forming the bottom.

Figure 5A:
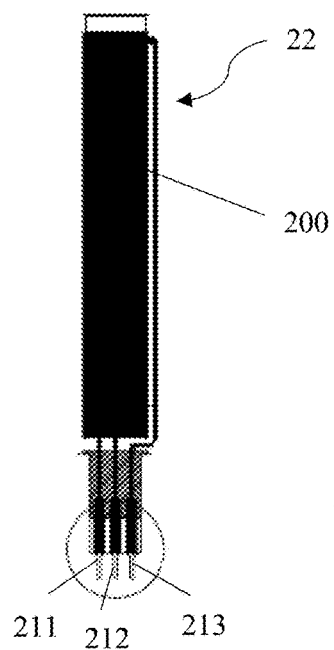
Figure 5B:
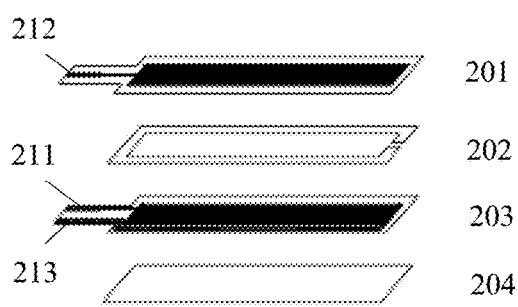
Figure 5C:
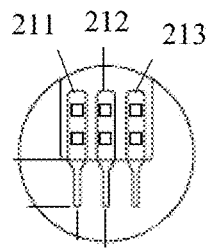
Figure 5D:
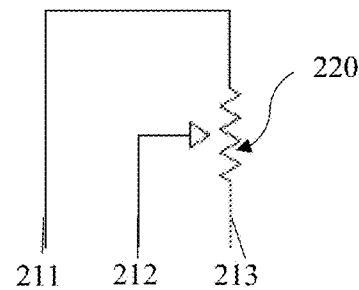

In line with conventional potentiometers there are 3 terminals 211, 212, 213, the center terminal 212 being provided by the protection sheet 201 between the other 2 terminals 211, 213 connected to the circuit layer 203, see FIGS. 5a to 5c. From FIG. 5d it can be seen that by pressing the protective sheet 201 on the circuit layer 203 via the wheel 28 the resistance 220 will change such that the position of the wheel 28 along the active material 200 can be determined by the outputted voltage.

Figure 6:
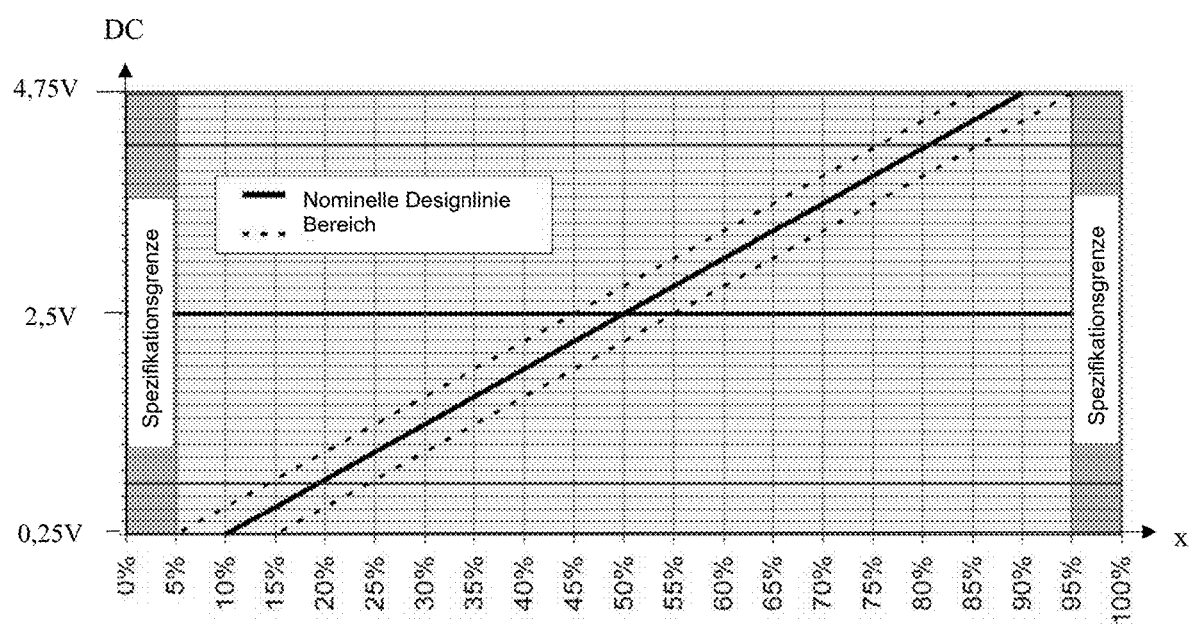
FIG. 6 is a chart of the voltage output of the sensor device of FIG. 2 as a function of the travel path of applied pressure along an active area of the sensor device.

As a result, the voltage outputted by the membrane sensor 22 matches the functionality of other memory actuators at a 5 V DC supply with a 5% to 95% range of said supply; 0.25 V DC to 4.75 V DV with 0° being at 2.5 V DC, as shown in FIG. 6.

The drive assembly 1, therefore, can be used as a powerfold style actuator to provide voltage feedback in relation to the position of a mirror head (not shown) relative to a mirror base (not shown). The same holds true with respect to a camera or combine camera and mirror system relative to a base. Said position can be used by a vehicle electronic control unit to fulfil a drive assistance function and/or by a vehicle memory unit for e.g. driver adaption.

While the present invention has been described in terms of preferred embodiments in order to facilitate better understanding of the invention, it should be appreciated that various modifications can be made without departing from the principles of the invention. Therefore, the invention should be understood to include all such modifications within its scope.

REFERENCE SIGNS 1 drive assembly
5 lower housing
6 upper housing
7 projecting support means
10 motor shaft
12 projecting support means
20 sensor device
22 membrane sensor
24 attachment ring
26 biased shaft
28 rotating pressure wheel
200 active area
201 protective sheet
202 spacer
203 circuit layer
204 double sided tape
211 terminal
212 terminal
213 terminal
220 resistor

What is claimed is:

1. A sensor device adapted for position detection associated with a drive assembly of a rear view device of a vehicle, the sensor device comprising:
a membrane position sensor,
wherein the drive assembly comprises at least one shaft driven by a DC motor, and the membrane position sensor acts as a potentiometer the resistance of which depends on a relative rotational position of the motor shaft,
wherein the membrane position sensor comprises at least one active area extending along at least one region between two opposite ends of the membrane sensor, and at least one of:
a first end of the two opposite ends of the membrane position sensor is fixedly attached to the motor shaft and a second end of the two opposite ends of the membrane position sensor is fixedly attached to a reference means relative to which the motor shaft can rotate so that rotation of the shaft in a first direction tightens the membrane position sensor and rotation of the motor shaft in a second direction being reverse to the first direction loosens the membrane position sensor, or
the membrane position sensor is fixedly attached at least along the active area to a reference means relative to which the motor shaft can rotate and a wiper is attached to the motor shaft to rotate therewith such that rotation of the motor shaft in a first direction forces the wiper to travel along the active areas away from the first end and rotation of the motor shaft in a second direction being reverse to the first direction forces the wiper to travel along the active areas towards the first end.

2. The sensor device of claim 1, wherein the wiper comprises a wheel rotatable attached to a biased shaft) mounted on the motor shaft via a ring fitted around the motor shaft.

3. The sensor device of claim 2, wherein the biased shaft is provided with a pressure spring between the wheel and at least one of the motor shaft or the ring.

4. The sensor device of claim 2, wherein at least one of:
the ring is attached by at least one of form or press fitting to the motor shaft, or
a projecting support means is provided on or with the motor shaft.

5. The sensor device of claim 1, wherein proportional feedback to the pressure induced by the tightening or pushing of the wiper on the active area results in a controlled voltage output, derived from a stable 5 V DC supply, wherein an output ranges from 0.25 V DC to 4.75 VDC.

6. The sensor device of claim 1, wherein at least one of:
the membrane position sensor is at least partly curved, at least along the active area from the first end to the second end, or
the membrane position sensor, at least along the active area from the first end to the second end, has a length allowing determining a rotation of the motor shaft of at least 90° and up to 180°.

7. The sensor device of claim 1, wherein the membrane position sensor comprises a protective sheet associated with a first terminal, a spacer, a circuit layer with a second and third terminal and a double sided tape for attachment, with the first terminal being arranged between the second and third terminal.

8. A drive assembly of a rear view device comprising a head carrying at least one reflective element, display or camera and a base to be attached to a vehicle, the drive assembly comprising:

a first shaft driven by a first DC motor for a power fold suited to pivot the head relative to the base and a first sensor device associated with the first motor shaft according to claim 1; or at least one second shaft driven by at least one second DC motor for at least one of tilting or turning the reflective element, the display, or the camera relative to at least one of the head or the base and at least one second sensor device associated with the at least one second motor shaft according to claim 1.

9. The drive assembly of claim 8, wherein the reference means is provided by a housing, a housing part, or a drum housing, which is fixed to the base or the head.

10. A rear view device comprising, the drive assembly of claim 8, wherein each sensor device is connected to at least one of an electronic control unit, the vehicle electronic control unit, or the vehicle memory unit.

11. The rear view device of claim 10, wherein dual sensors are provided in an 'X' formation to output two voltages, one of which is an X angle and the other being a Y angle to provide positional feedback voltages to the vehicle electronic control unit.

* * * * *